United States Patent
Oglesby et al.

[19]

[11] Patent Number: 6,155,276
[45] Date of Patent: Dec. 5, 2000

[54] APPARATUS AND METHOD FOR REMOVING SOIL CONTAMINANTS

[76] Inventors: Kenneth E. Oglesby, 4227 W. Ninth St., Amarilo, Tex. 79106; Len Morris, 6227 N. Highway 146, #70, Bay Town, Tex. 77520

[21] Appl. No.: 09/165,780

[22] Filed: Oct. 2, 1998

[51] Int. Cl.[7] .................................................. B08B 3/04
[52] U.S. Cl. ...................... 134/66; 134/25.1; 134/119; 134/144
[58] Field of Search .......................... 134/25.1, 66, 119, 134/120, 144, 153; 405/128

[56] References Cited

U.S. PATENT DOCUMENTS

| | | |
|---|---|---|
| 4,919,570 | 4/1990 | Payne . |
| 4,927,293 | 5/1990 | Campbell . |
| 4,993,873 | 2/1991 | Tippmer . |
| 5,056,541 | 10/1991 | Schade et al. . |
| 5,236,282 | 8/1993 | Teasel et al. . |
| 5,242,246 | 9/1993 | Manchak, III et al. . |
| 5,242,580 | 9/1993 | Sury . |
| 5,244,308 | 9/1993 | Mims . |
| 5,271,694 | 12/1993 | Cooper . |
| 5,288,330 | 2/1994 | Ballard et al. . |
| 5,295,761 | 3/1994 | Heacock et al. . |
| 5,302,287 | 4/1994 | Losack . |
| 5,340,406 | 8/1994 | Fearon . |
| 5,439,597 | 8/1995 | Allen . |
| 5,460,194 | 10/1995 | Hancock, Jr. et al. ................ 134/66 X |
| 5,507,953 | 4/1996 | Machlitt et al. . |
| 5,527,982 | 6/1996 | Pal et al. . |
| 5,544,975 | 8/1996 | Vigneron et al. . |
| 5,588,947 | 12/1996 | Studer et al. . |
| 5,637,152 | 6/1997 | Robinson et al. ..................... 134/66 X |
| 5,637,154 | 6/1997 | Shorthouse . |
| 5,671,762 | 9/1997 | Hancock, Jr. et al. ................ 134/66 X |

*Primary Examiner*—Philip R. Coe

[57] ABSTRACT

A portable ground soil remediation apparatus and method utilizing a water and biodegradeable soap mixture to result in an safe solution to effectively remove crude or refined oil from the soil, as well as the toxins associated with this type of contamination. The present invention includes at least one elongated, rotatable chamber filled with the soap mixture and having internal lifting means to pick up soil and provide cleansing with the soap mixture. Additionally, a means for injecting fluid is placed within the chamber to provide additional cleansing capability and to replenish the soap mixture. The present invention is adapted to allow effective soil movement through at least one soil cleaning chambers, which minimizes wear due to the lack of internal blades and other moving components.

19 Claims, 9 Drawing Sheets

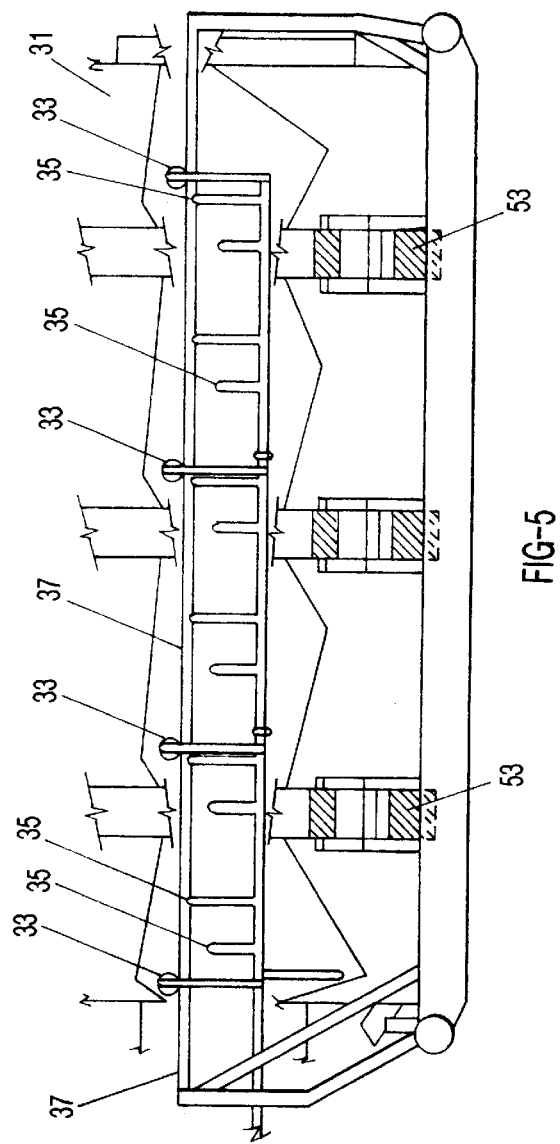
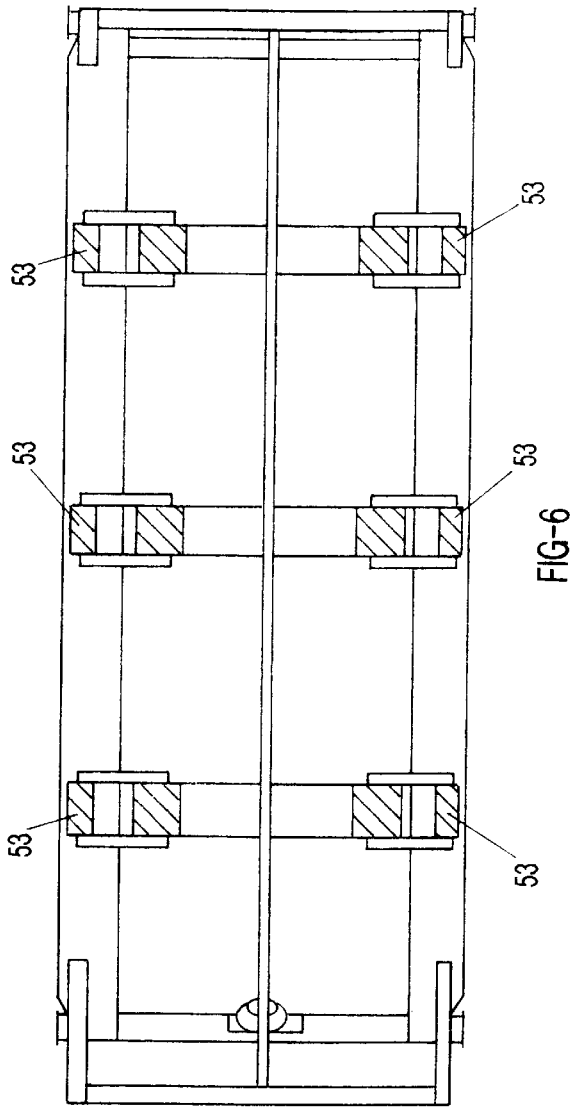
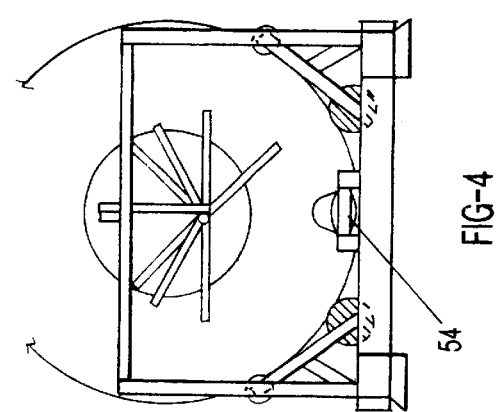

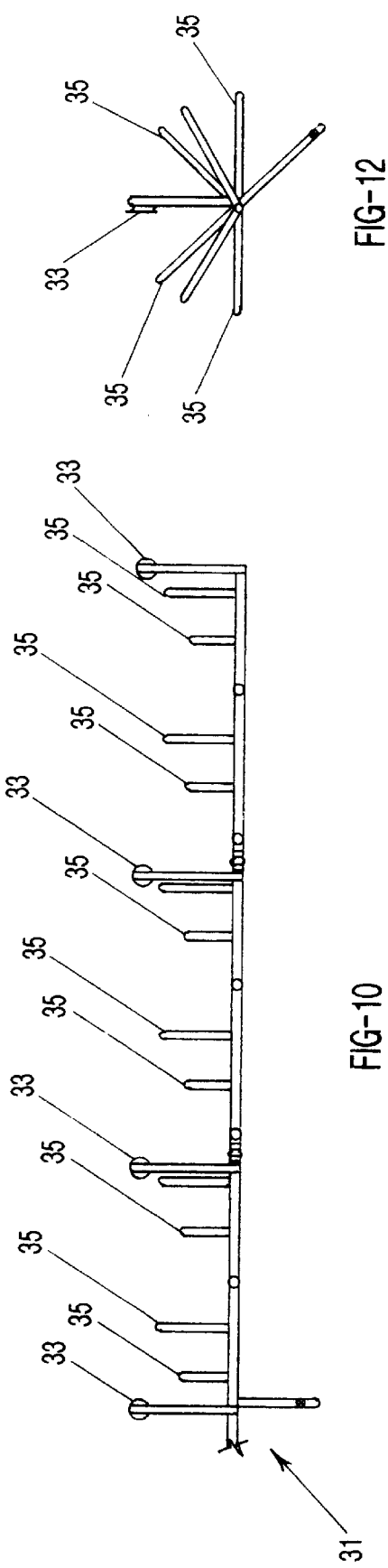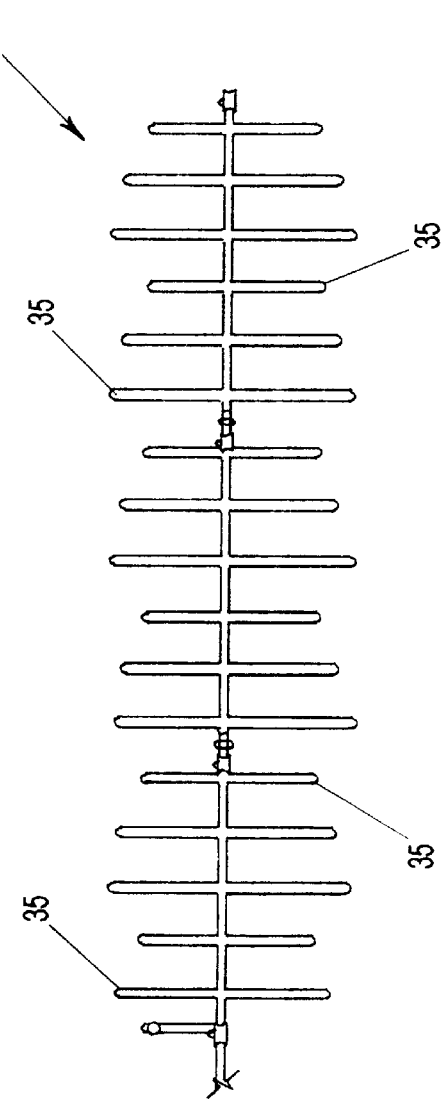
FIG-12
FIG-10
FIG-11

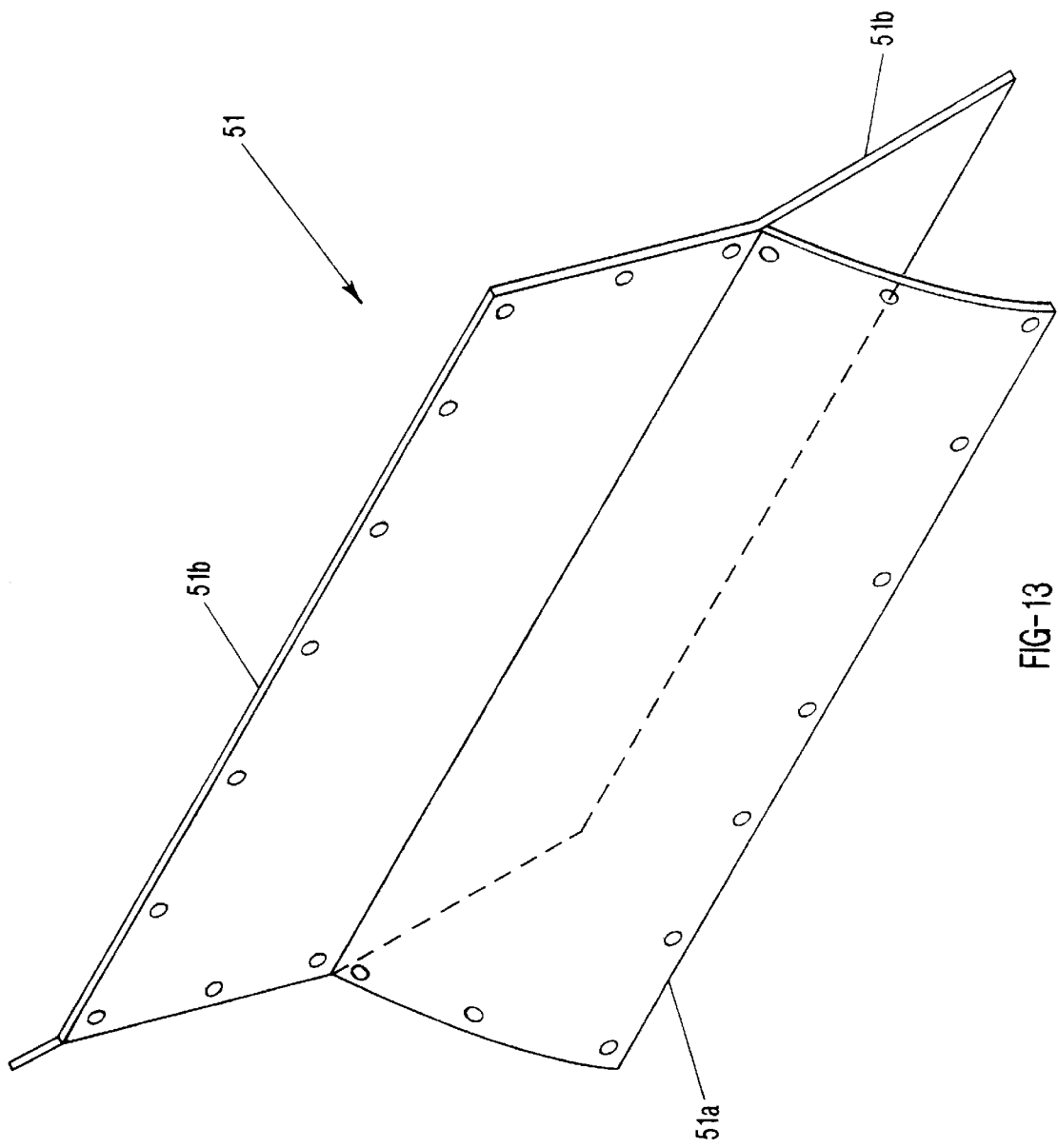

APPARATUS AND METHOD FOR REMOVING SOIL CONTAMINANTS

FIELD OF THE INVENTION

The present invention relates to an environmentally friendly ground soil remediation system. The present invention allows effective soil movement through at least one soil cleaning chamber, which minimizes wear due to the lack of internal blades and other moving components.

BACKGROUND OF THE INVENTION

Due to the government's interest in protecting and cleaning up the environment, Congress has enacted several laws and regulations relating to environmental remediation. These laws and regulations are due, for the most part, to increased manufacturing waste, service industry waste and even waste from governmental projects which ultimately contaminate the soil. Contaminants such as hydrocarbons and metals, including lead, can be found in contaminated soil. If these contaminants are not removed from the soil, they will likely proliferate through the soil to reach groundwater and create other environmental problems which are difficult to cure.

Typically, soil known to be contaminated is excavated and transported to a landfill or a soil remediation site for cleansing. The cleansed soil is then returned to its original location. This process can become time consuming and extremely expensive depending upon the type of apparatus used to cleanse the soil and the techniques involved. Despite the logistical problems, this process is a necessary step in cleaning contaminated soil.

Numerous patents relating to soil remediation exist. For example, U.S. Pat. Nos. 5,637,154 to Shorthouse, 5,588,947 to Studer et al., 5,340,406 to Fearon and 5,288,330 to Ballard et al. are all recent examples of various devices and techniques employed to remediate contaminated soil.

In contrast to the prior art teachings, the present invention is a safe, effective means for treating hydrocarbon contaminated soil by providing a system which agitates a soil/water/biodegradeable soap mixture and subsequently heats the soil to result in an environmentally safe solution to effectively remove crude or refined oil from the soil, as well as the toxins associated with this type of contamination.

The novel features of the present invention will become apparent to those of ordinary skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of ordinary skill in the art from the detailed description of the invention and claims that follow.

BRIEF DESCRIPTION OF THE DRAWINGS

FIG. 4 is a front cross sectional view of FIG. 1;

FIG. 5 is a partial right side cross sectional view of FIG. 1;

FIG. 6 is a partial top side cross sectional view of FIG. 1;

FIG. 10 illustrates a side view of the means for injecting fluid of the present invention;

FIG. 11 is an alternate embodiment of FIG. 10;

FIG. 12 is a right side view (as viewed from the discharge end of the present invention) of FIG. 10;

FIG. 13 illustrates a representative lifting means of the present invention;

DETAILED DESCRIPTION OF THE INVENTION

Figure 1:
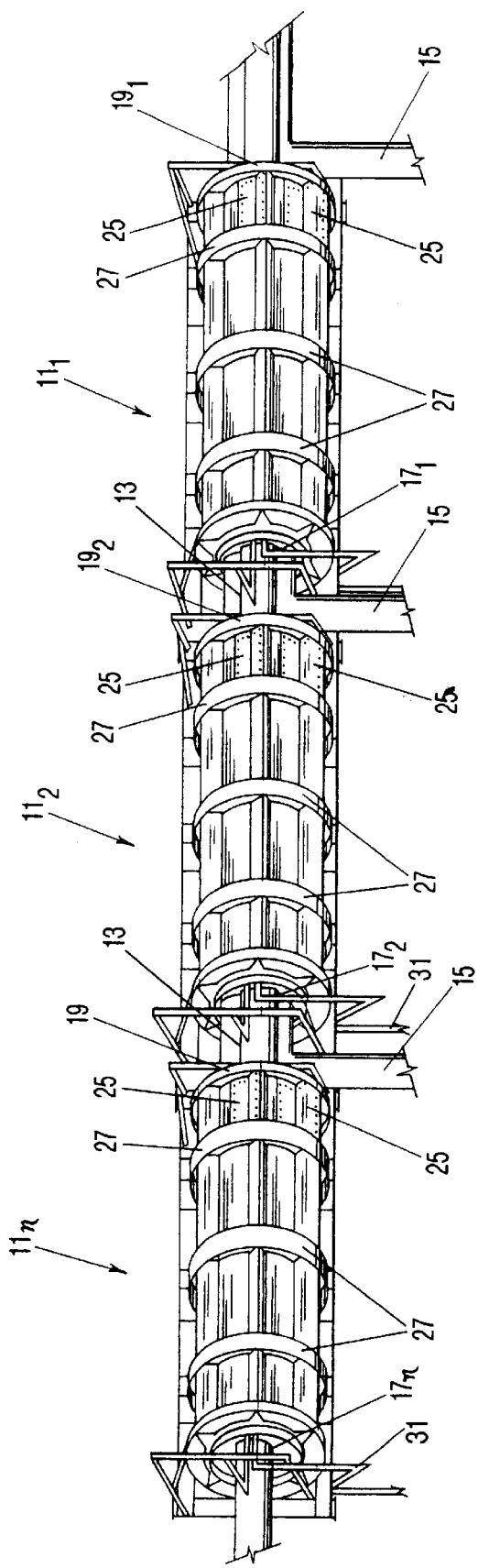
FIG. 1 is a top perspective view of the present invention.
Figure 2:
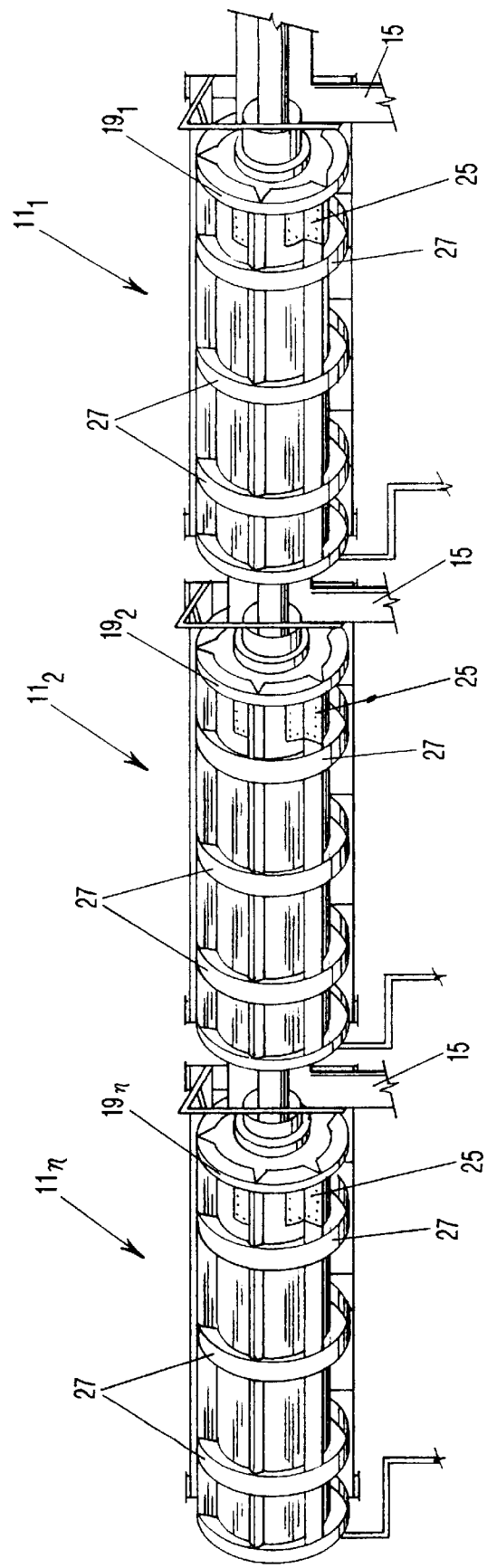
FIG. 2 is an opposite top perspective view of FIG. 1.

As seen in FIG. 1, the present invention is an apparatus for removing soil contaminants, which includes at least one elongated, rotatable soil cleaning chamber $11_1$, $11_n$ (hereafter generally referred to as item 11), each cleaning chamber 11 being in soil communication with an adjacent chamber 11 through at least one soil transport means 13 and a plurality of troughs 15.

Figure 7:
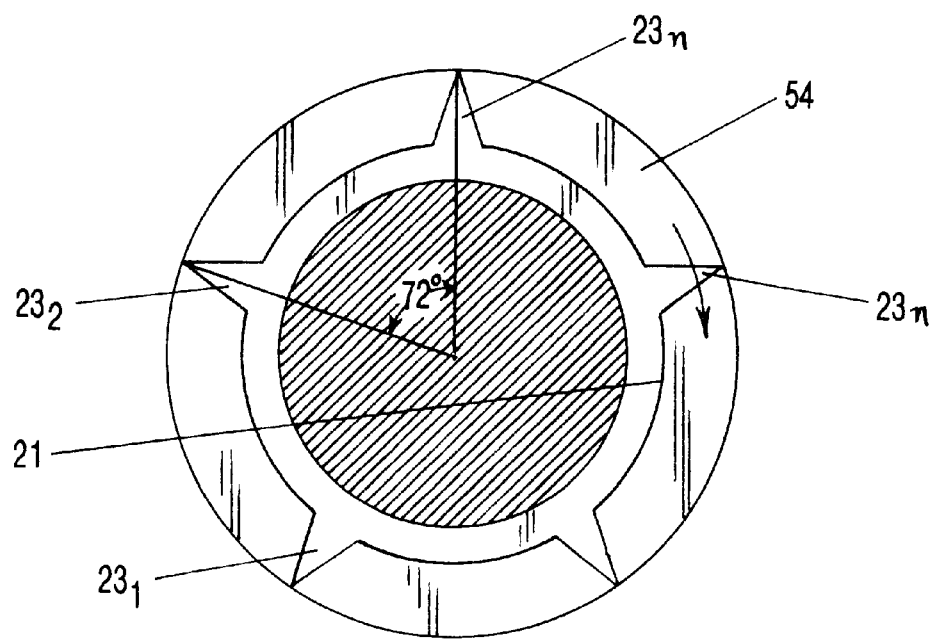
FIG. 7 is front cross sectional view of the soil cleaning chamber of the present invention.
Figure 8:
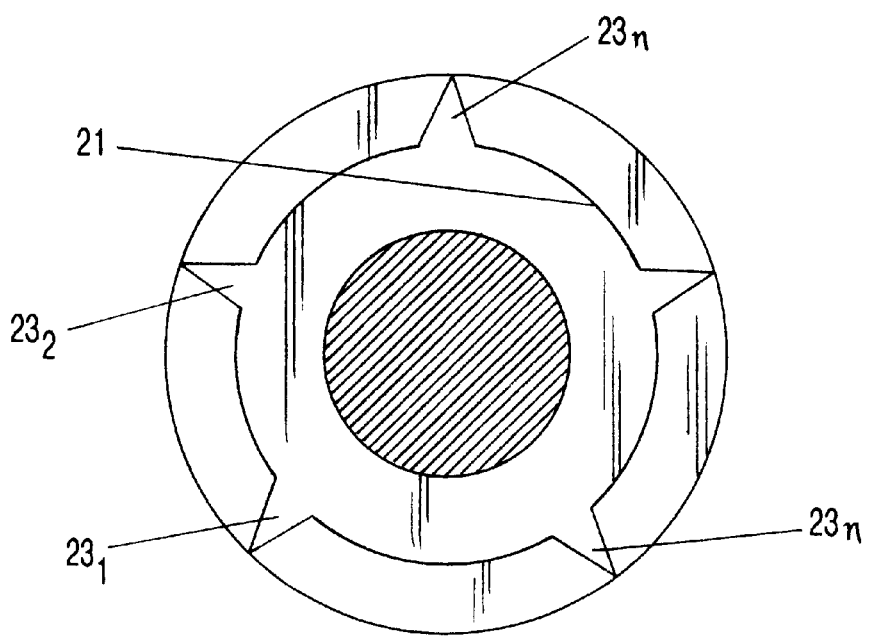
FIG. 8 is an rear cross sectional view of the soil cleaning chamber of the present invention.

Each cleaning chamber 11 is an elongated, hollow, cylindrical tube having an open charge end (for example, $17_1$) in which contaminated soil enters the chamber, and an open discharge end (for example, $19_1$) in which cleaned soil leaves the chamber. As seen in FIGS. 7 and 8, the interior facade 21 of each cleaning chamber is hollow and generally tubular. However, a plurality of channels $23_1$, $23_n$ are formed a predetermined distance apart within the interior facade 21 which extend almost entirely the internal length of each chamber 11. When viewed from either the charge end 17 or the discharge end 19, the cross section of the internal facade 21 of each chamber 11 resembles a star configuration as seen in FIGS. 7–8. The depth and angle of each channel $23_n$ is designed to capture most if not all of the soil as each chamber 11 rotates. Preferably, at both charge end 17 and discharge end 19, wear plates 25 are employed to prevent erosion of interior facade 21 due to the constant entry, exit and movement of soil through each chamber 11.

Figure 9:
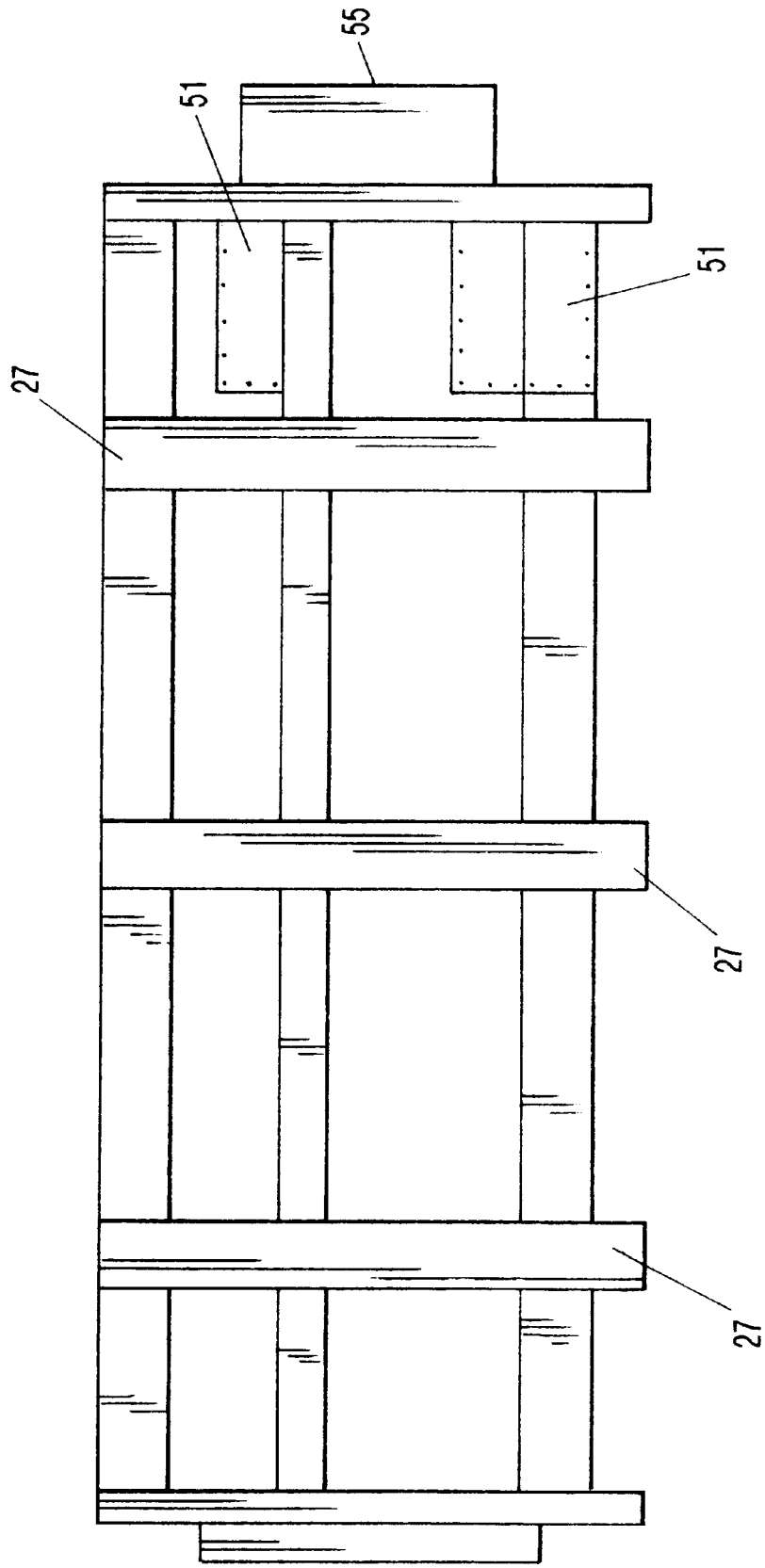
FIG. 9 is a side cross sectional view of the soil cleaning chamber of the present invention, illustrating the guide rings of the present invention.

Additionally, as seen in FIGS. 9 and 13, each chamber 11 has a plurality of lifting means 51 attached to opposite interior ends of chamber 11, both near the charge end 11 and the discharge end 19. As seen in FIG. 13, located near discharge end 19 are a plurality of lifting means 51 attached to the interior facade 21 of chamber 11. Lifting means 51 preferably are removable, blade-shaped devices for picking up the soil in variable quantities and deposit the soil on another conveyor means 15 if additional cleansing is necessary. As seen in FIG. 13, a preferable lifting means 51 is illustrated. In employing lifting means 51, the solution level maintained in the solution chambers serves to float the oil to the discharge end of the vessel. Lifting means 51 are attached to chamber 11 by conventional means such as by nuts and bolts. Employing lifting means 51 allows the operator to increase or decrease the amount of soil be processed, while at the same time, allows the separated contaminant (e.g., oil) to be pulled from chamber 11 in centered fashion for depositing directly on conveyor 13 thereby preventing the contaminant from reentering chamber 11.

The entire length of each chamber 11 is preferably homogenous, which means, for example, that the internal and external diameters and shapes are substantially maintained though the entire length of each chamber 11. Thus, charge end's 17 diameter is approximately equivalent to the discharge end's 19 diameter. Alternatively, to accommodate more soil loading, charge end's 17 diameter can be larger than discharge end's 19 diameter.

Figure 15:
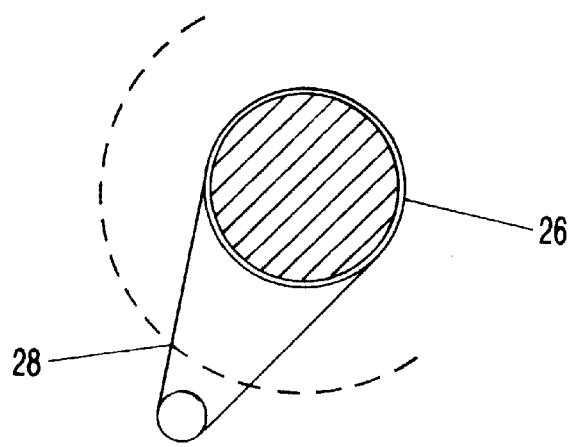
FIG. 15 illustrates a representative drive means employed in the present invention.
Figure 16:
FIG. 16 is an end view of FIG. 14 without an angled flat piece.

As seen in FIGS. 1 and 9, circumscribing each chamber 11 is a plurality of guide rings 27 attached to the chamber. Preferably, guide rings 27 sit upon a transport means 29 (such as, for example, a towable trailer) for portable use. Preferably, each chamber 11 will be allowed to "free float" on a bed of variably-sized rollers 53 (as seen in FIGS. 4 and 6) of various sizes and hydraulicly supported (such as, for example, by a shock absorber) in order to allow for more resistance-free rotation. The rollers sit upon roller flange 54 to allow the invention to wear evenly and can be a commercially purchased item. Further, at least one guide ring 27 attached to each chamber 11 is adapted to be supported by and engage with a drive means (not shown) upon the transport means 29. The drive means, in turn, provides frictional energy to the guide rings to thereby produce rotational movement of the chamber 11. The preferred drive means is either a DC electric motor (which is energized by on-site electricity) or hydraulic motors and pumps (again, the pumps being energized by onsite electricity). The drive means can be mounted inside the frame of the bed of each chamber 11 and, as best illustrated in FIG. 15, drive a sprocket and chain assembly 28 connecting with a sprocket 26 that will be specially built to fit over a skimming neck 26 attached to the discharge end 19 of the chamber. If hydraulic power is employed, the necessary supply lines will be integrated with the heat exchange system because of the heat generated by the hydraulic process.

Each cleaning chamber 11 is preferably angled up to 12 degrees maximum from charge end 17 to discharge end 19. In having each chamber 11 angled, the rotation of each chamber is assisted to move the internal soil as well as assisting in soil/solution agitation. Of course, those of skill in the art will realize that the exact tilt of each cleaning chamber 11 can be modified to further facilitate movement of various soil types though the solution.

As seen in FIG. 5 and in FIG. 10, running substantially through each chamber 11 is a means for injecting fluid 31 having a plurality of guide wheels 33 and a plurality of discharge jets 35 in fluid communication with each other. The means of injecting fluid 31 is not in mechanical contact with each chamber 11, but rather, is supported within each chamber 11 by a guiding rail means 37 (as seen in FIG. 5), which allows wheel guides 33 to slide along the interior of each chamber 11.

Figure 3:
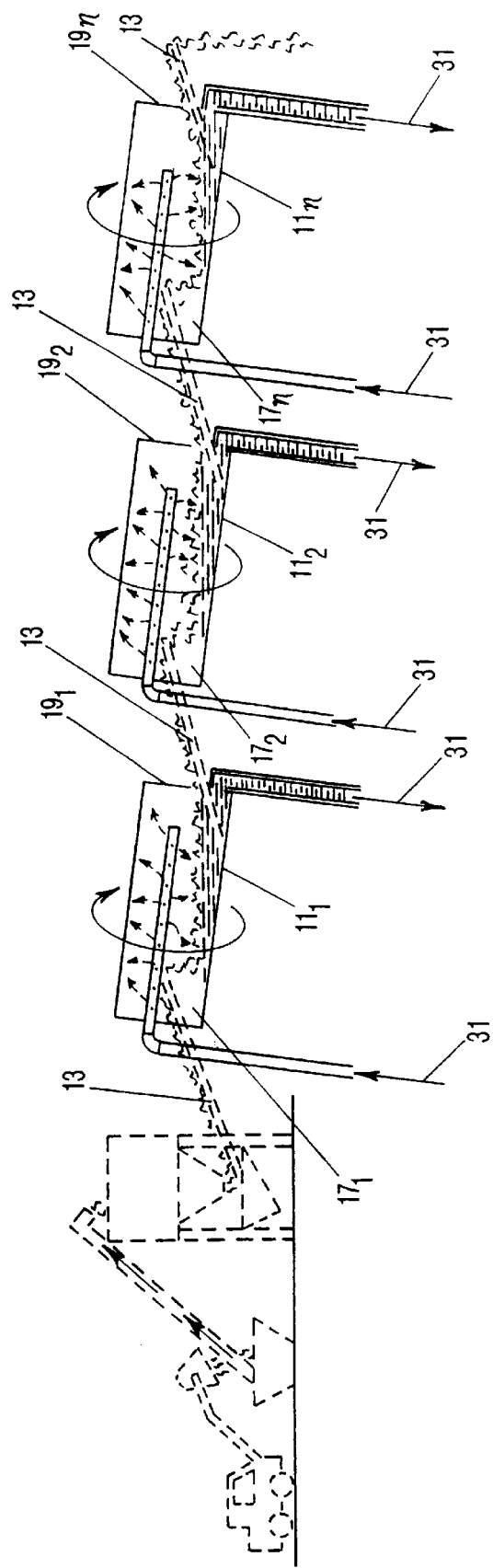
FIG. 3 is a right side cross sectional view of FIG. 1.

As seen in FIG. 6, guiding rail means 37, in conjunction with wheel guides 33, also assists the operator for easy installation of each means for injecting fluid 31, as well as the removal of each means for injecting fluid 31. The discharge jets have outlets 39 which are positioned and adapted to provide an optimum squirt angle for any fluid injected into any of chambers 11. Preferably, outlets 39 and jets 35 are positioned so that the coordinate direction of any fluid injected into chamber 11 forms an angle between 30 degrees and 45 degrees. Thus, for example as seen in FIG. 10, discharge jets 35 are positioned within the interior of chamber 11 so that the flow of fluid from outlets 39 can be adjusted accordingly by the operator depending on the type of soil to be cleaned or other conditions. As seen in FIG. 3, means for injecting fluid 31 enters one chamber $11_1$ through charge end $17_1$ and exits the chamber through discharge end $19_1$. It is preferable that the cleansing solution inserted into means for injecting fluid 31 can be water, hot water, soap/water mixture or even a soap/water/soda ash mixture, and that all cleansing solution be reclaimed for additional use if possible.

Optionally employed by the present invention yet not illustrated in the drawings are skimming tanks which are sectional pits which isolate the initial solution/oil return in the first section. These skimming tanks are adapted to allow the oil to be skimmed from the top of the solution in this section, as well as allowing the minute particles of soil to settle out of the solution. The other areas of the tank serve as settlement areas, before being pumped back through the heat exchanger and solution chamber. As such, these tanks allow fluids to move and can have various configurations. For example, one tank can hold the oil which is taken from contaminated soil. Such tanks are commercially available, or can be built by an operator as necessary.

In the preferred embodiment, three or more cleansing systems in series are employed to remediate the contaminated soil. In field tests, approximately 50–70 percent of the contaminating oil is removed in the first stage of this operation, with the remainder of cleansing occurring in subsequent stages. Therefore, it is preferable that each solution have its own isolated skimming tank.

Figure 14:
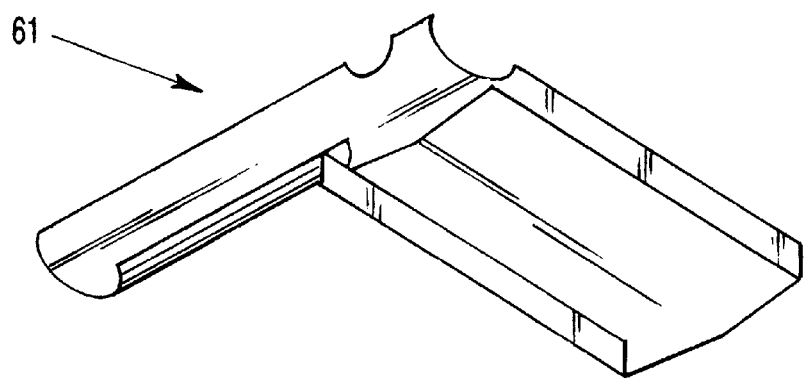
FIG. 14 illustrates a discharge trough having an angled flat piece optionally employed in the present invention.

In operation, as seen in FIG. 3, contaminated soil is first crushed to reduce larger rocks and clods of soil to a manageable size. This process also aerates and loosens the soil. The soil is then introduced to a first stage solution chamber $11_1$ by a conveyor means 13. As the soil enters the charge end $17_1$, it is lifted and dropped for several iterations (preferably ten iterations). Simultaneously, the soil soap solution is continuously pumped through the chamber by the means for injecting fluid 31 at a predefined pressure rate and predetermined spraying angle to thoroughly saturate the soil. The soil soap solution inside the chamber is maintained by the size of the skimming ring 55 angle of the chamber. As such, this positioning and sizing of the skimming ring 55 allows the soil to be dropped into the solution as well as being sprayed from the top of the chamber. The movement of the rotatable chamber tends to keep the oil away from the interior walls of the chamber and allows the oil and solution to be removed via the skimming ring 55 and into an adjacent flowline. Any remaining solution will thus fall away from the soil during the transfer from one stage to the next will be caught in the discharge trough 61 (as seen in FIG. 14) located directly beneath the transfer conveyor, and is moved to the flowline where it joins the rest of the solution and skimmed oil on its way to the skimming tanks. Discharge trough 61 is employed to catch any discharge which falls off one conveyor as the discharge travels from one chamber to the next chamber. As such, employing discharge trough 61 provides an added protective measure of keeping the immediate environment clean of debris or discharge.

The cleansing solution will be pumped from the skimmer tanks, through a heat exchanger system, through the means for injecting fluid 31 and jetted in various directions in the first seventeen to twenty feet of chamber 11. The remaining three feet will be undisturbed in order for the lifting blades to be able to dump the cleaned soil onto the transfer conveyors. The present invention provides for treating contaminated soil by a plurality of steps such as removing the contaminated soil from the area, crunching the same to a workable size and then passing the crushed material to a first stage solution chamber. The chamber is rotated to lift and drop the soil into a solution of cleaning material pumped through a delivery system and pressure sprayed at various angles to saturate the moving soil.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of an apparatus for removing soil contaminants, is followed.

What is claimed is:

1. An apparatus for removing soil contamination comprising:
   (a) at least one elongated, hollow, rotatable soil cleaning chamber having an open charge end for introduction of contaminated soil, an open discharge end for discharge of soil and an interior facade, the interior facade formed with a plurality of channels along a length of the chamber a predetermined distance apart to capture soil as the chamber rotates, the chamber further including a plurality of removable lifting means for picking up soil attached to opposite ends of the chamber;
   (b) a means for injecting fluid running substantially through each chamber and being supported therein by a guiding rail means;
   (c) a plurality of guide rings attached to and circumscribing the chamber at predetermined locations; and
   (d) a cleansing solution pumped into and flowing through the means for injecting fluid at a predefined pressure.

2. The apparatus for removing soil contamination of claim 1 further including at least one wear plate attached to the surface of each chamber near the chamber's charge end and the chamber's discharge end.

3. The apparatus for removing soil contamination of claim 2 wherein each chamber is angled up to twelve degrees from a horizontal position.

4. The apparatus for removing soil contamination of claim 3 wherein the lifting means for picking up soil is a blade.

5. The apparatus for removing soil contamination of claim 4 wherein the means for injecting fluid further includes a plurality of wheel guides and a plurality of discharge jets, the wheel guides attached in moving relationship to the guiding rail means to allow the wheel guides to slide along the interior and outside of each chamber.

6. The apparatus for removing soil contamination of claim 5 wherein the plurality of discharge jets further includes a plurality of outlets positioned to provide a desired squirt angle for fluid injected into each chamber.

7. The apparatus for removing soil contamination of claim 6 wherein the desired squirt angle is between thirty degrees and forty-five degrees.

8. The apparatus for removing soil contamination of claim 5 wherein the cleansing solution comprises an biodegradable admixture of water and soap.

9. The apparatus for removing soil contamination of claim 5 wherein a diameter of the charge end is substantially equivalent to a diameter of the discharge end.

10. The apparatus for removing soil contamination of claim 5 further including a transport means having variably-sized rollers, the variably-sized rollers further attached to a roller flange, the guide rings sitting upon and contacting the variably-sized rollers for substantially resistance free rotation of the chamber.

11. The apparatus for removing soil contamination of claim 10 further including a drive means for producing rotational movement, at least one guide ring being attached to the drive means in frictional relationship.

12. The apparatus for removing soil contamination of claim 11 wherein the drive means is a drive and sprocket assembly.

13. The apparatus for removing soil contamination of claim 12 wherein the drive means is a direct current electric motor.

14. The apparatus for removing soil contamination of claim 12 wherein the drive means comprises a hydraulic motor and a pump.

15. A system for treating soil comprising a plurality of elongated, hollow, rotatable cleaning chambers, each chamber having an open charge end for introduction of contaminated soil and an open discharge end for the emission of cleaner soil into an adjacent chamber, each chamber further having a plurality of channels formed along a length of the chamber, the system further comprising a means for injecting fluid placed substantially within each chamber and supported by a guiding rail means, a cleansing solution pumped into the means for injecting fluid at a predefined pressure and at predefined angles, and a plurality of guide rings upon each chamber and circumscribing each chamber.

16. The system of claim 15 wherein the means for injecting fluid further includes a plurality of wheel guides and a plurality of discharge jets, the wheel guides attached in moving relationship to the guiding rail means to allow the wheel guides to slide along the interior and outside of each chamber.

17. The system of claim 16 wherein the plurality of discharge jets further includes a plurality of outlets positioned to provide a desired squirt angle for fluid injected into each chamber between thirty degrees and forty-five degrees.

18. The system of claim 17 further including a transport means having variably-sized rollers, the variably-sized rollers further attached to a roller flange, the guide rings sitting upon and contacting the variably-sized rollers for substantially resistance free rotation of the chamber, and a drive means for producing rotational movement, at least one guide ring being attached to the drive means in frictional relationship.

19. The system of claim 18 wherein the drive means is a drive and sprocket assembly.

* * * * *